Jan. 14, 1969  R. C. KRACHMER  3,421,434
APPARATUS FOR FORMING SAUSAGE
Filed Aug. 12, 1966  Sheet 1 of 2
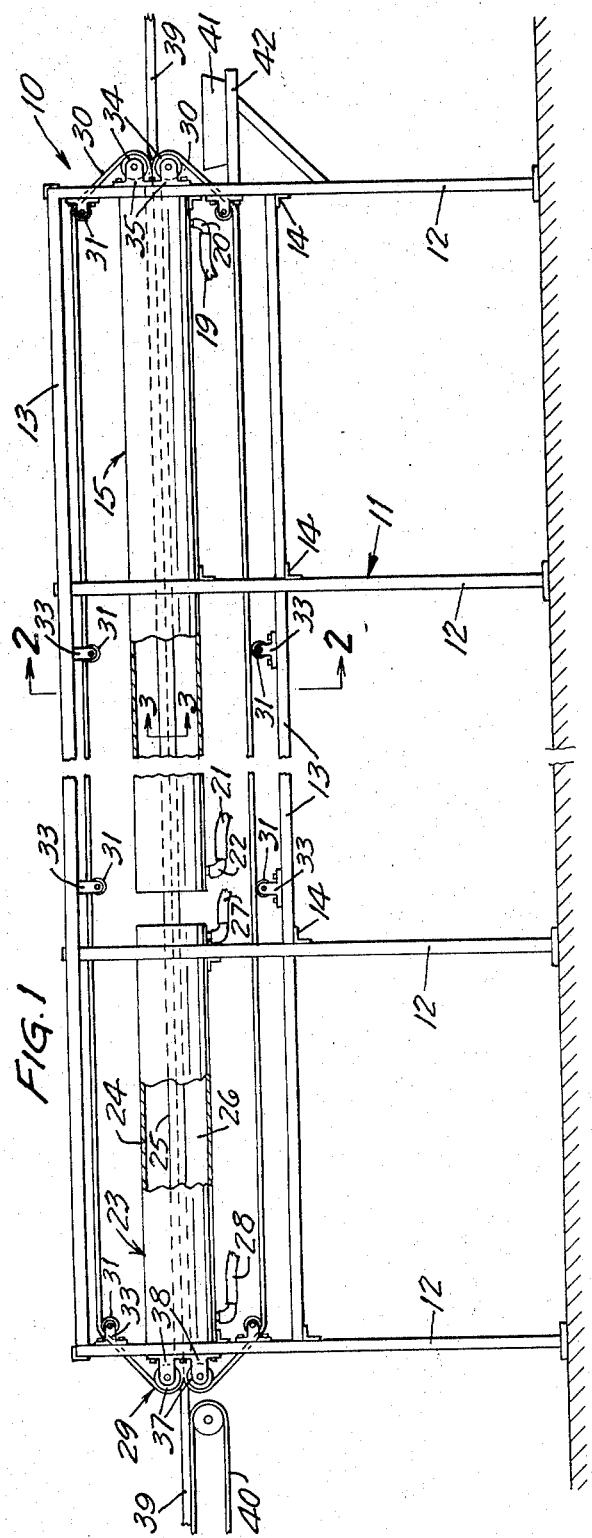
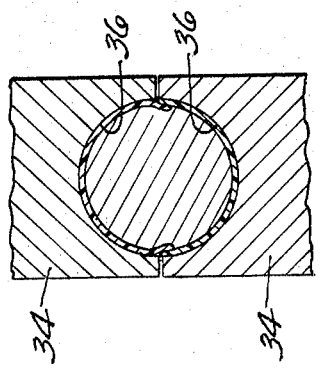
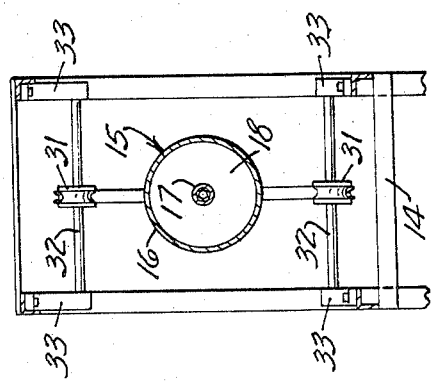
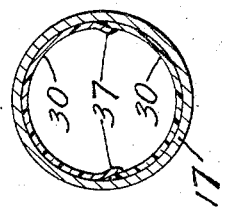
INVENTOR
ROBERT C. KRACHMER
Williamson, Palmatier & Bains
ATTORNEYS

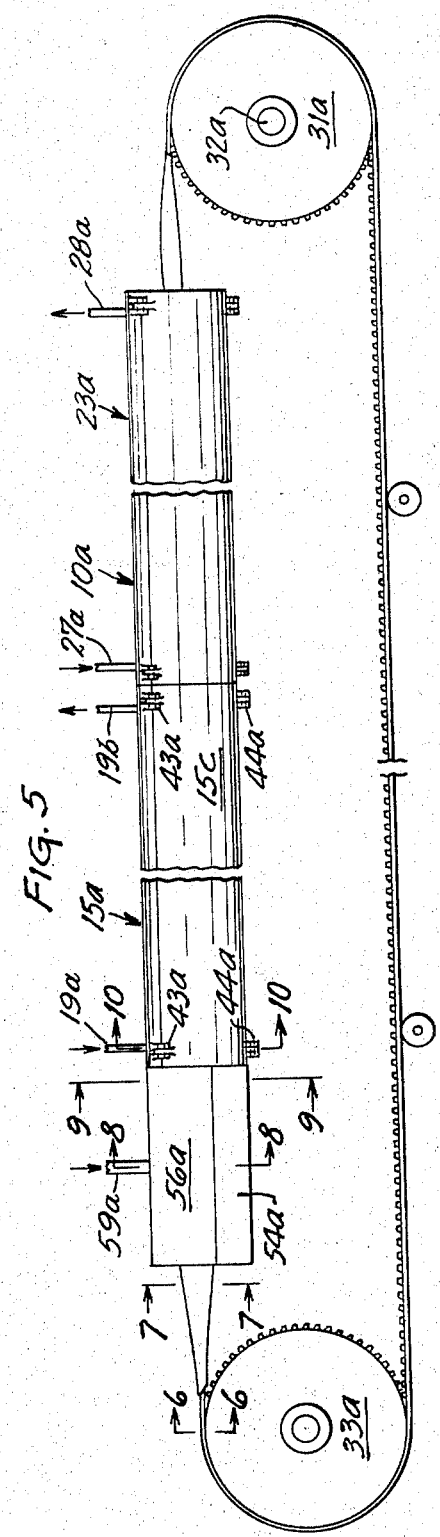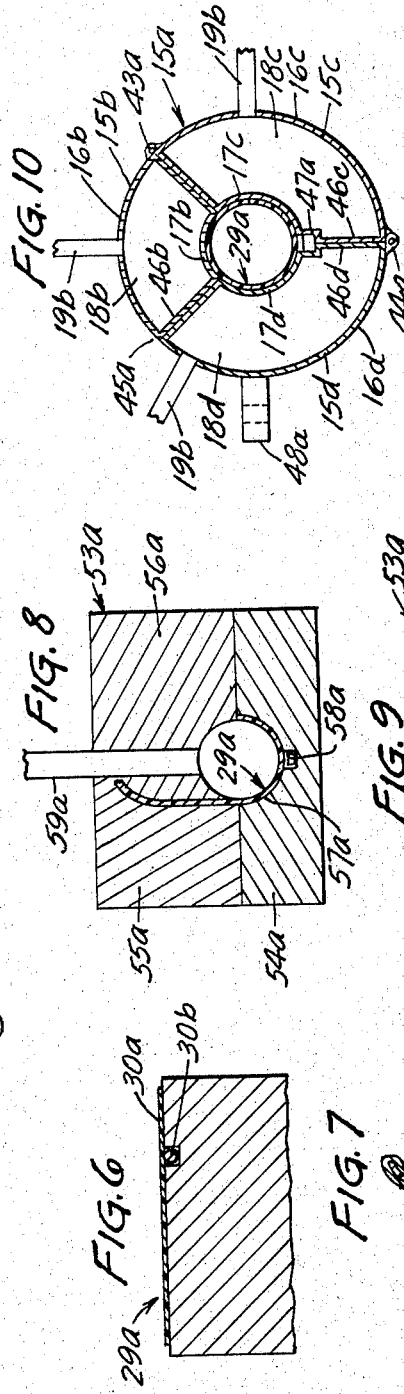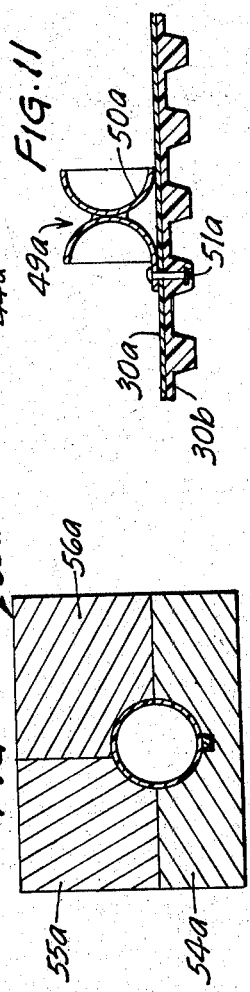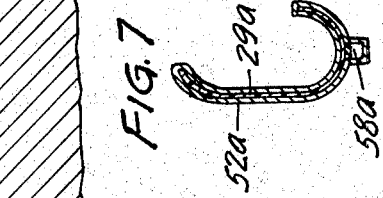

United States Patent Office 3,421,434
Patented Jan. 14, 1969

3,421,434
APPARATUS FOR FORMING SAUSAGE
Robert C. Krachmer, Austin, Minn., assignor to Geo. A. Hormel & Company, Austin, Minn., a corporation of Delaware
Filed Aug. 12, 1966, Ser. No. 572,047
U.S. Cl. 99—352                                    3 Claims
Int. Cl. A23p 1/00

ABSTRACT OF THE DISCLOSURE

Apparatus and process for continuously molding and partially cooking an elongate, rod-shaped food product, such as sausage, including an elongate endless flexible mold structure comprising a flexible belt. The inner run of the mold structure being moved successively through a heating structure of tubular configuration and a cooling structure. A nozzle mechanism for injecting a flowable meat product into the belt structure as it is shaped into cylindrical configuration to thereby cause at least partial cooking of the product while in cylindrical configuration and subsequent cooling.

---

An object of this invention is to provide a novel and improved process and apparatus in which a preferably flexible mold structure continuously receives a protein containing food mixture and is moved in a predetermined path of travel through a heating zone so that the protein mixture is coagulated to permanently set the mixture into a rod shaped formation which is thereafter continuously released from the mold structure.

Another object of this invention is to provide a novel and improved process and apparatus of the kind described which is especially adaptable for production of brown-and-serve type sausages.

A more specific object of this invention is to provide a high capacity process and apparatus for producing skinless sausages and the like in which the raw product is continuously fed to a moving mold forming belt structure and is enclosed thereby, the belt structure being moved through a heating zone to at least partially cook the raw product, and is thereafter moved through a cooling zone prior to longitudinal opening of the belt structure to continually release the product in a dimensionally stable rod shaped formation.

These and other objects and advantages of our invention will more fully appear from the following description made in connection with the accompanying drawings, wherein like reference characters refer to the same or similar parts throughout the several views, and in which:

FIG. 1 is a diagrammatic side elevational view of one form of the apparatus used to carry out the process, with certain parts thereof broken away and foreshortened for clarity.

FIG. 2 is an enlarged cross sectional view taken approximately along the line 2—2 of FIG. 1 and looking in the direction of the arrows.

FIG. 3 is an enlarged cross sectional view taken approximately along the line 3—3 of FIG. 1 looking in the direction of the arrows, and FIG. 4 is an enlarged fragmentary detail view illustrating a pair of cooperating pulley structures which engage the belt structure during operation of the apparatus.

FIG. 5 is a diagrammatic side elevational view similar to FIG. 1 of another form of the apparatus used to carry out the process, with certain parts thereof broken and foreshortened for clarity;

FIG. 6 is a cross-sectional view on an enlarged scale taken approximately along line 6—6 of FIG. 5 and looking in the direction of the arrows;

FIG. 7 is a cross-sectional view on an enlarged scale taken approximately along line 7—7 of FIG. 5 and looking in the direction of the arrows;

FIG. 8 is a cross-sectional view on an enlarged scale taken approximately along line 8—8 of FIG. 5 and looking in the direction of the arrows;

FIG. 9 is a cross-sectional view on an enlarged scale taken approximately along line 9—9 of FIG. 5 and looking in the direction of the arrows;

FIG. 10 is a cross-sectional view on an enlarged scale taken approximately along line 10—10 of FIG. 5 and looking in the direction of the arrows;

FIG. 11 is a fragmentary cross-sectional view of the mold forming belt structure illustrating details of construction thereof.

Referring now to the drawings and more specifically to FIG. 1, it will be seen that one form of the novel apparatus designated generally by reference numeral 10 is there shown. This apparatus includes a supporting frame structure comprised of a plurality of vertical frame elements 12 which are interconnected by a plurality of longitudinally frame elements 13, and a plurality of transverse frame elements 14. The lower ends of the vertical frame elements may be rigidly secured to the floor of the building by any conventional securing means.

The supporting frame structure 11 supports an elongate, double wall heating or cooking structure 15 which is comprised of an elongate outer tubular member or jacket 16 and an inner tubular member 17 disposed in concentric relation with respect to the outer tubular member. Opposite ends of the outer tubular member are closed with respect to the exterior while the inner tubular member communicates at opposite ends with the exterior. Referring to FIG. 2, it will be noted that the inner tubular member is spaced from the outer tubular member to define the heating chamber 18 throughout the length thereof. In the form shown, the heating or cooking structure 15 has steam applied to the heating chamber 15 through a conduit 19 which is connected to a suitable source of steam under pressure and to a fitting 20 on the outer tubular member 16. An outlet conduit 21 is connected to a fitting 22 also carried by the outer tubular member 16 which intercommunicates the conduit 21 with the chamber 18. It will be noted that the inlet conduit 19 is connected to the heating structure adjacent one end thereof and that the outlet conduit is connected thereto adjacent the opposite fitting thereof.

Thus steam under pressure is applied to the heating chamber 18 whereby the inner tubular member is heated throughout its entire length.

A cooling or chilling structure 23 is also mounted on the frame structure 11 and has one end thereof disposed in close proximity but longitudinally spaced relation with respect to one end of the heating structure 15. It will be noted that the chilling structure 23 also includes a jacket or outer tubular member 24 and an inner tubular member 25 disposed in concentric relation within the outer tubular member. The opposite ends of the outer tubular member 24 are closed with respect to the exterior while opposite ends of the inner tubular member 25 are open, and are disposed in axial alignment with the inner tubular member 17 of the heating structure 15. It will be noted that both the heating structure and the chilling structure are mounted on certain of the transverse frame members of the supporting frame structure 11.

Referring again to FIG. 1, it will be seen that the inner tubular member 25 is spaced radially inwardly from the outer tubular member 24 so that a chilling or cooling chamber 26 is defined therebetween substantially throughout the length of the inner tubular member 25. A suitable coolant or refrigerant such as Freon or the like will be circulated through the chilling chamber 26 through conduits 27 and 28 respectively which are connected by suitable fittings to the outer tubular member 24 that intercommunicate the conduits with the chilling chamber 26. These conduits 27 and 28 are connected to a source of refrigerant under pressure and serve to cool the inner tubular member 25 throughout its entire length.

Means are provided for molding and moving a comminuted flowable protein containing mixture in rod shaped form first through the heating structure and then through the chilling structure whereby the food product is rendered dimensionally stable in substantially rod shaped configuration. This means comprises a mold forming belt structure designated generally by the reference numeral 29 which is also mounted on the supporting frame structure 11. This mold forming belt structure 29 includes a pair of similar flexible endless belt members 30 preferably formed of a glass base and generally sold under the trade name Flourglas fabric having a relatively thin thickness dimension and capable of withstanding extreme cold and high temperature extremes without deformation. The components of Flourglas fabric comprise mechanical grade glass fabric impregnated and coated with polytetrafluoroethylene which does not stiffen, crack, mildew or support fungus. Flourglas fabric also has good dimensional stability and excellent anti-friction and non-stick properties. The belts 30 are trained about a plurality of idler or guide pulleys 31 having suitable pulley shafts 32 which are journaled in bearings 33 carried by the supporting frame structure 11. It will be noted that the guide pulleys 31 are located in a vertical center-line plane of the heating and chilling structures 15 and 23 respectively.

It will be seen that the belt members 30 are also trained about a pair of forming pulleys 34 adjacent the inlet end of the heating structure 15, the pulleys 34 having pulley shafts which are journaled in bearings 35 carried by the supporting frame structure 11. Referring now to FIG. 4, it will be seen that the forming pulleys 34 while being slightly spaced apart vertically, are disposed in very close proximity with respect to each other, and to the inlet end of the inner tubular member 17. It will further be noted that these pulleys have a concave outer surface or groove 36 therein, which together with other means cause the belt members 30 to be disposed in opposed relation so that the longitudinal edges thereof are arranged in lapped relation as at 37. Therefore, when the food mixture containing protein is injected into the space between the belt members, the belt members will define an elongate tubular shaped mold corresponding generally to the inner circumferential surfaces of the inner tubular members 17 and 25 respectively. This moving, flexible, cylindrical shaped mold will enclose the food mixture therein as the mold member passes sequentially through the heating structure and the chilling structure.

Another pair of pulleys 37 are disposed in close proximity to the discharge end of the chilling structure 23 and these pulleys 37 are provided with suitable pulley shafts which are journaled in bearings 38 mounted on the supporting frame structure 11.

The pulleys 37 are similar in construction to forming pulleys 34 and are interrelated to each other and to the discharge end of the chilling structure in a manner similar to the forming pulleys 34. Although not shown in the drawing, it is pointed out that the pulleys 37 are both connected to suitable drive means for driving the pulleys so that the belt members are pulled simultaneously in mold forming relation first through the heating structure and thereafter through the chilling structure. This drive means may be a suitable electric motor having driving connections with both of the pulleys 37 in a well known manner.

Means are also provided for injecting the flowable material into the space between the belt members 30 as the latter move into the inlet end of the heating structure 15. This means includes a nozzle injector mechanism 39 which is connected to a suitable source of the food mixture under pressure. The food mixture containing protein may be moved through a conduit connected to the nozzle mechanism 39 by suitable pump means so that the food mixture is forced from the orifice of the nozzle into the space between the belt members 30. This action occurs just as the belt members 30 enter the inlet end of the heating structure 15 so that the belt members are forced into contacting relation with respect to the inner surfaces of the inner tubular members 17. Thus the product containing belt members will have a substantially circular cross-sectional shape as illustrated in FIG. 3 during movement of the belt members through the heating structure 15. It will therefore be seen that the belt members 30 cooperate with the forming pulleys 34 and the inner tubular member 17 of the heating structure to form a continuously moving substantially flexible tubular molding structure when material is injected thereinto, and as the belt members are moved through the heating structure. It is pointed out that the belt members will have a lapped joint at the longitudinal edges as illustrated in FIG. 3 whereby the material will be substantially enclosed by the belt members during travel thereof through the heating structure.

Means are also provided for receiving the formed product from the discharge end of the chilling structure 23, and this means may include an endless apron type conveyor mechanism having one end thereof positioned to receive and support the product as the same is discharged or released by the belt members 30. A suitable tray 41 supported on a support type platform 42 may be positioned against the inlet end of the heating structure 15 to receive any of the flowable food mixture which is not forced into the space between the belt members 30 as a result of back pressure or the like.

During operation of the apparatus 10 for carrying out the novel method, the food mixture which is in comminuted flowable form is injected from the nozzle mechanism 39 into the space between the belt members 30 as the latter enters the inlet end of the heating structure 15. The belt members are disposed in juxtaposed mold-forming relation as the belt members enter the inlet end of the heating structure. The pressure exerted by the material will cause the belt members to distend in a radial direction to substantially contact the inner surface of the inner tubular member 17 as the belt members are moved axially through the inner tubular member 17. These belt members therefore define a generally elongate tubular flexible mold which substantially encloses the food mixture during movement of the tubular shaped mold through the heating and chilling structures. The food mixture contained within the tubular mold is subjected to a temperature and for a length of time to at least partially cook the same so that the protein in the mixture is coagulated and then thereby render the product dimensionally stable into rod shaped formation. When steam is used as the heating medium, the temperature of the inner surfaces of the inner tubular member 17 is approximately 212° F., or this temperature may be somewhat higher if the steam pressure within the heating chamber 18 is increased.

It is pointed out that the temperature of the heating zone, the length thereof, and the speed of the belt members, is such that the food mixture within the belt members will be subjected to a desirable temperature for the necessary time to accomplish at least partial cooking or partial coagulation of the protein and in some instances substantially complete cooking of the food mixture. In this regard, it is pointed out that rather than a steam type heating structure, an electronic cooking or heating structure could be utilized such as microwave or induction type heating and cooking. With an electronic cooking or heating structure, the belt members 30 could be moved at a relatively higher speed than with the steam type cooking so that the over-all exposure time to the heating zone will be substantially shortened.

After the food mixture is permanently set in rod shaped formation through action of protein coagulation, the mold forming belt members 30 thereafter pass into the chilling structure 23. The diameter of the inner surface of the inner tubular member 25 is substantially the same as the diameter of the inner surface of the tubular member 17. Therefore the mold forming belt members 30 will be moved into contact relation with the inner surface of the inner tubular member 25 and the permanently set food product will be cooled and chilled as the belt members move through the chilling zone. It is pointed out that the product will be chilled to the desired degree, the chill factor being determined by the temperature of the chilling structure and the amount of time the product is subjected to the chilling temperature.

Thereafter, as the belt members 30 move outwardly of the outward end of the chill structure 23, the belt members will move over the pulleys 37 and out of contacting relation with respect to the rod shaped food product, the latter being supported in the embodiment shown by the conveyor mechanism 40. Thus it will be seen that the mold forming belt members actually open up longitudinally to release the food product so that the latter is continuously formed in an uninterrupted operation.

Because of the endless construction of the belt members 30, substantially the entire lower run or flight of the uppermost belt member and the uppermost flight of the lowermost belt member are in continuous mold forming relation. Although not illustrated in the present embodiment, the upper flight or run of the uppermost belt member 30 and the lowermost flight of the lower belt member may be passed through a washer or other suitable cleaning mechanism to clean these belt members prior to re-entry into the inlet end of the heating structure 15. Such washer mechanisms could be supported from the supporting frame structure 11 in an appropriate position. It is also pointed out that a cutting mechanism may be provided for cutting the continuous rod shaped formation into suitable lengths for subsequent packaging, or the like.

As pointed out above, the instant process and apparatus is especially adaptable for molding and partially cooking meat products such as skinless cooked pork sausage which not only includes the brown-and-serve type, but also sausages which are substantially completely cooked.

Although in the embodiment shown, a pair of belt members are utilized, a single belt member may also be used of the type which is provided with closure fastening elements along the longitudinal edges thereof. These closure fastening elements interlock with each other in the manner of a zipper, and suitable guide rollers or pulleys as well as belt closing rollers and pulleys may be used to guide a closed belt into tubular or sleeve form adjacent the inlet end of the heating structure 15. It is also pointed out that a suitable belt opener will be provided adjacent the discharge end of the chilling structure 23, and a belt apparatus of this kind may be of the type known as Zipper belts in the trade.

Referring now to FIGS. 5 through 11, it will be seen that a modified form of the apparatus designated generally by the reference numeral 10a is there shown. This apparatus also includes a supporting frame structure (not shown) which may be similar in construction to that illustrated in the embodiments of FIGS. 1 through 4. A double wall heating or cooking structure 15a is also provided which is formed into three longitudinally extending arcuate sections 15b, 15c, and 15d. The arcuate section 15b is hingedly connected to section 15c by hinge 43a while the hinge means 44a swingably interconect the sections 15c and 15d together. Releasable locking means 45a releasably interlock the arcuate sections 15b and 15d together. It is pointed out that section 15d will be rigidly mounted on the supporting frame of the apparatus by a bracket 48a.

It will be noted that the arcuate section 15b includes an outer arcuate member 16b and an inner arcuate member 17b interconnected by longitudinal elements 46b. Similarly, section 15c also includes an outer arcuate element 16c interconnected to an inner arcuate element 17c by longitudinal elements 46c. Section 15d, on the other hand, also includes an arcuate outer element 16d interconnected to an arcuate inner element 17d by longitudinal elements 46d. Thus, the interior of the section 15b defines a heating chamber 18b while the interiors of the chambers 15c and 15d respectively define the heating chambers 18c and 18d. Each section has a suitable inlet conduit 19a and an outlet conduit 19b which conduits intercommunicate the sections with a source of steam under pressure.

It will be noted that the inner arcuate elements 17b, 17c and 17d define a tubular mold recess when the respective sections are in the closed condition. Abutting longitudinal elements on the sections 16c and 16d are recessed at their respective innermost ends to define a longitudinal generally channel-shaped recess 47a throughout the length of the chamber. This recess is to accommodate the chain of the mold forming belt structure which will be described hereinbelow.

A cooling or chilling structure 23a is also provided and is similar in construction to the heating or cooking structure 15a. This chilling structure 23a is also of sectional construction in the manner of the heating structure and the various sections thereof are hingedly connected together to permit opening and closing of these sections. The chilling structure also has a cylindrical passage therethrough through which the belt forming structure passes during the formation of the product. The chambers in each of the sections is adapted to have a suitable coolant or refrigerant such as Freon or the like, to be circulated therethrough so that the product will be cooled as it is passed through the cooling structure. Since the cooling structure also includes three sections in the manner of the heating structure 15a, three inlet conduits 27a are provided each being connected in communicating relation to one of the sections and being connected to a source of coolant or refrigerant under pressure. Each section is also provided with a discharge conduit 28a which is interconnected in communicating relation with the source of refrigerant. Thus, the coolant or refrigerant will be constantly circulated through the chilling structure so that the inner surface thereof which engages the product will be at a relatively low temperature.

The embodiment illustrated in FIGS. 5 through 11 also includes a mold forming belt structure 29a which is also mounted for movement through the heating and chilling structures. The mold forming belt structure 29a includes a single flexible endless belt member 30a preferably formed of a glass base generally sold under the tradename "Flourglas fabric," having a relatively thin thickness dimension and capable of withstanding extreme cold and hot temperatures.

The endless belt 38 has an elongate endless sprocket engaging member or chain 30b secured thereto which is trained about a driven sprocket 31a affixed to a shaft 32a. It is pointed out that shaft 32a will be connected to a source of power which revolves the shaft and causes the upper run of the mold forming belt structure 29a to be moved through the heating and cooling structures. The mold forming belt structure 29a is also trained about an idler sprocket 33a as best seen in FIG. 5. It will be noted that the chain 30b is affixed to the belt member in offset relation with respect to the transverse center of the belt member. The chain 30b is therefore located more closely adjacent one longitudinal edge of the belt member 30a as best seen in FIG. 6 and the other longitudinal edge thereof.

Means are provided for shaping the belt into cylindrical configuration so that the product therein will be molded in the form of elongate cylindrical links. This means includes a hollow guide structure 52a which is shaped and contoured to gradually shape the mold forming structure from flat configuration to channel-shaped configuration. It will be seen that as the mold forming belt structure passes through the guide structure, as best seen in FIG. 7, one side of the channel formed thereby projects above and beyond the other side thereof. Thus, the guide structure serves to permit the belt to pass therethrough and gradually shapes the belt as it is moved over the idler pulley 33a for entry into a mold forming structure 53a. This guide structure also has a smaller channeled shaped passage 58a in the lower portion thereof which communicates with the hollow interior thereof and which accommodates the sprocket engaging member or chain 30b as it passes therethrough.

The shaping structure 53a is interposed between the guide structure 52a and the heating structure 15a and this shaping structure serves to gradually shape the belt member 30a into substantially cylindrical configuration. The shaping structure is comprised of three shaping blocks 54a, 55a and 56a respectively, disposed in engaging relationship, each being of rectangular configuration whereby the shaping structure itself is also rectangular configuration. It will be noted that the shaping structure 53a has an axially extending cylindrical opening therein and also has a slot 57a which communicates with this cylindrical opening. The slot 57a is of a configuration which gradually causes the belt disposed therein to be gradually guided into cylindrical configuration as best seen in FIGS. 8 and 9. A filler tube 59a passes downwardly through the shaping structure 53a and is connected in communicating relation to a source of sausage batter or emulsion whereby the material may be fed into the cylindrical opening through the shaping structure and interiorly of the mold forming belt structure just prior to closing of the latter. With this arrangement, the belt member 30a may be filled just prior to its being completely shaped into cylindrical configuration. It will be seen that when the belt member 30a enters the heating structure 15a, it will be in cylindrical configuration and will be filled with the uncooked sausage product.

Reference is now made to FIG. 11 where it will be seen that divider means may be provided for separating the sausage product located in the belt member into individual links. This divider means, designated generally by the reference numeral 49a, comprises a pair of generally hemispherical elements 50a affixed together and having their concavities facing in opposite directions. These hemispherical elements 50a are preferably formed of a suitable rigid plastic material and are secured to the belt member and chain by suitable securing means such as the nut and bolt assembly 51a.

During operation of this embodiment, the flowable comminuted sausage product will be introduced into the mold forming belt structure when the latter is in the partially closed condition, and the mold forming structure will have to be moved first through the heating structure and thereafter through the cooling structure. The food mixture contained within the tubular mold will be subjected first to a temperature for a length of time to at least partially cook the same so that the protein and the mixture is coagulated and the product is rendered dimensionally stable. Thereafter, the product passes through the chilling structure and will be chilled prior to the passage of the product through the exterior. Suitable belt opening means may be provided for opening the belt after the same is discharged from the chilling structure. Thus, it will be seen that the embodiments of FIGS. 5 through 11 operates in a similar manner to the embodiment of FIGS. 1 through 4.

From the foregoing it will be noted that I have provided a novel process and apparatus which is capable of continuously molding a food mixture into rod shaped formation which is rendered dimensionally stable by at least partially cooking the food mixture and coagulating the protein thereof, and thereafter chilling the product prior to continuous release of the product from the mold forming members. The mold forming structure, while being of substantially flexible endless construction, is continuously re-used and therefore obviates the cost experienced in conventional sausage making operations attributable to the casings which are discarded. Thus, the process and apparatus disclosed herein is not only capable of high capacity efficient operation, but may be carried out more economically than the conventional sausage making operations.

Thus, it will be seen that I have provided a novel process and apparatus which is not only of simple construction and operation, but functions in a more efficient manner than any heretofore known comparable process and apparatus.

What is claimed is:

1. Apparatus for molding and partially cooking an elongate rod-shaped comminuted meat product, said apparatus comprising a heating structure including an elongate inner tubular member and an elongate outer tubular member disposed in spaced-apart relation and defining a heating chamber therebetween sealed from the exterior, said inner tubular member having an inlet end and an outlet end, means interconnecting said heating chamber in communicating relation with a source of steam under pressure, a cooling structure including an elongate inner tubular member and an elongate outer tubular member disposed in spaced-apart relation and defining a cooling chamber therebetween sealed from the exterior, said cooling inner tubular member being disposed in coaxial relation with said heating inner tubular member and having an inlet end and an outlet end, said inlet end of the cooling inner tubular member being disposed in closely proximal relation with the outlet end of said heating inner tubular member, means interconnecting said cooling chamber in communicating relation with a source of fluid coolant, a pair of spaced-apart revolvable circular sprocket members, one of which is positioned exteriorly of the inlet end of said heating inner tubular member and in close proximity thereto, and the other of said sprocket members being disposed exteriorly of and in closely proximal relation with the outer end of said cooling inner tubular member, one of said sprocket members being driven, a mold forming structure, including an endless flexible belt trained about said sprocket members and having an inner run movable through said heating inner tubular member and said cooling inner tubular member, said flexible belt having an outer run positioned exteriorly of said heating and cooling structure, a shaping structure positioned exteriorly of and adjacent the inlet end of said heating inner tubular member and having a shaping slot therethrough which the belt passes to progressively shape the same into a closed tubular configuration, the belt when in tubular configuration engaging the inner surfaces of the heating inner tubular member and cooling inner tubular member as it passes therethrough, an injection mechanism connectible to a source of flowable food product and having a discharge end positioned to discharge flowable food product into the volumetric space defined by the belt just prior to closing of the belt into tubular configuration.

2. The apparatus as defined in claim 1 wherein the outer run of said belt is disposed in substantially flat configuration.

3. The apparatus as defined in claim 1 wherein said shaping structure is positioned between one of said sprocket members and said inlet end of said heating inner tubular member.

References Cited

UNITED STATES PATENTS 2,542,673   2/1951   Hedwall -------------- 17—34

FOREIGN PATENTS 891,175   3/1962   Great Britain.

HYMAN LORD, Primary Examiner.

U.S. Cl. X.R.

17—1, 35, 45; 99—109, 384, 427, 441